Oct. 10, 1950     R. G. HAMILTON     2,524,972
MAGNETIC EYECUP
Filed May 3, 1949
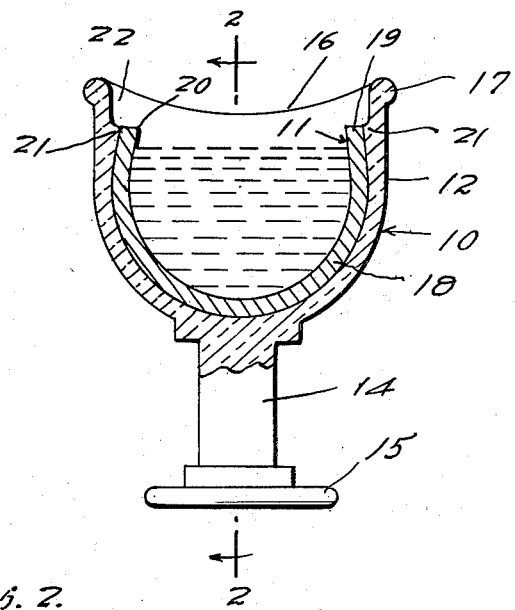
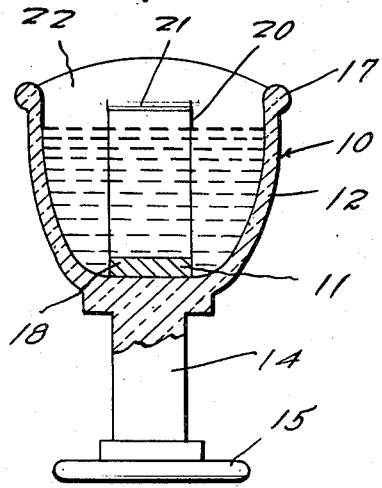
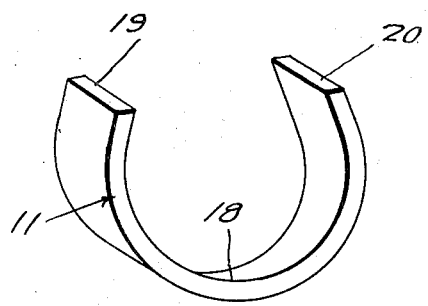
INVENTOR.
Raymond G. Hamilton
BY
McMorrow, Berman + Davidson
ATTORNEYS Patented Oct. 10, 1950

2,524,972

UNITED STATES PATENT OFFICE 2,524,972

MAGNETIC EYECUP

Raymond G. Hamilton, Salem, Mass.

Application May 3, 1949, Serial No. 91,098

1 Claim. (Cl. 128—1.3)

This invention relates to an eye cup, and more particularly to an eye cup having a magnet therein for removing metal splinters or microscopic metal elements from an eye.

It is an object of this invention to provide an eye cup having a magnet supported therein adjacent the periphery thereof for removing metallic objects from an eye and for immediately bathing the cup in an eye wash or warmed cleaning solution. The eye wash solution will substantially loosen the metal objects from the eye in many instances, and the magnet will attract the object away from the eye into the cup.

Another object of this invention is to provide a magnetic eye cup of the character to be more particularly described hereinafter formed for suitably securing a horseshoe-type magnet therein with the poles of the magnet spaced within the cup away from the edges of the cup so that the metal picked up by the magnet will be held away from the eye so that it will not again become engaged therein.

A further object of this invention is to provide an eye cup of this kind which is formed as an economical and efficient means for removing metal obstructions or particles from the eye in a safe and antiseptic manner.

With the above and other objects in view, my invention consists in the arrangement, combination and details of construction disclosed in the drawings and specification, and then more particularly pointed out in the appended claim.

In the drawings:

Figure 1 is a longitudinal section through an eye cup constructed according to an embodiment of my invention;

Figure 2 is a transverse section thereof taken substantially on the line 2—2 of Figure 1;

Figure 3 is a perspective view of the horseshoe-type permanent magnet removed from its engagement with the eye cup.

Referring to the drawings, the numeral 10 designates an eye cup for containing therein a permanent magnet 11 in the manner and for the purpose to be hereinafter set forth.

The eye cup 10 is exteriorly formed as a conventional type of eye cup for washing the eyes and the like, having an upwardly-opening cup member or element 12 supported on a depending pedestal 14, and having an annular or flat base 15 fixed to or formed integrally with the extreme lower end of the pedestal 14. The eye cup element 12 is preferably formed of glass, plastic or other suitable material and is generally substantially oval in configuration. The extreme upper edge 16 of the periphery of the upper edge of the eye cup 12 is formed with a substantially arcuate recess along the longitudinal edges thereof, the upper ends of the end walls of the eye cup extending upwardly above the extreme lower edge of the recess formed along the longitudinal edges. The configuration or formation of the upper edge 16 of the eye cup 12 is formed for secure engagement of the eye cup about an eye when the eye cup is inverted over the eye for bathing the eye in a solution contained within the cup. A peripheral or marginal bead 17 is preferably formed about the extreme upper edge of the cup 12, the bead 17 being formed according to the configuration of the recessed or bowed outline of the longitudinal edges of the side walls of the cup. The circular bead 17 provides for the suitable firm engagement of the edge of the cup about an eye to substantially hold the liquid contained within the cup 12 about the eye while the eye is being washed.

As eye cups of this general type are insufficient for removing metal objects from the eye, the eye cup 10, formed according to an embodiment of this invention, is preferably formed for securing within the body of the cup 12 a permanent magnet 11. The permanent magnet 11 is formed of an elongated flat strip of metal bent into a substantially arcuate or horseshoe configuration, as clearly shown in Figures 1 and 3 of the drawings. The magnet 11 is of the permanet magnet type, wherein the opposite ends of the flat metal strip 18 are magnetized to form opposite poles at the opposite ends 19 and 20. The contour or configuration of the length of the body 18 is preferably formed for flatly overlying the inner surface of the cup 12 along the length thereof. The length of the body 18 is substantially bowed along the length thereof in an arcuate manner with the terminal ends 19 and 20 inclined inwardly above a diameter on which the body 18 is formed.

Inwardly-extending seats 21 are fixed to or formed integrally with the side walls of the body 12 at the opposite ends thereof, the inner surfaces of the seats 21 being bowed inwardly to conform to the outside edge of the longitudinally-bowed magnet bar 18. The distance between the inner edges of the confronting seats 21 is substantially less than the greatest diameter between the side arms of the longitudinally-bowed member 18, so that when the member 18 is engaged within the cup 12, the resiliency of the strip of metal 18 will substantially secure the magnet 11 within the cup.

The seats 21 are spaced downwardly within the cup below the extreme upper edge of the cup 12, and below the bead 17. The space 22 between the upper edges of the ends of the magnet 11 and the upper edge of the cup 12 provides a space within which the fluid contained within the cup 12 may suitably be disposed for washing the eye. The space 22 is sufficiently small so that the polar ends of the magnet 11 will be sufficiently close to the eyeball for drawing any metal particles which may be embedded in the surface thereof.

In the use and operation of the magnetic eye cup formed according to an embodiment of this invention, the eye cup will initially be filled with an eye wash solution and the eye cup applied to the eye of the person in a substantially conventional manner. The solution will suitably moisten the eye to facilitate the extraction of the embedded metal particles, and when the particles are attracted to the magnet 11, the particles will be engaged thereon in spaced relation to the eye, while the eye wash solution is still in contact with the eye and will suitably treat the wound from which the metal element has been extracted. With the opposite ends or poles of the magnet 12 disposed in the manner shown in Figure 1 of the drawings, the metal, magnetic ends of the magnet are not covered by any portion of the eye cup 12, so that the magnet is in no way insulated from the eye or any metal articles embedded therein. Upon extraction of the metal articles from the eye, the eye wash solution, which is substantially an antiseptic type, generally, will suitably cleanse the wound from which the metal has been extracted, thereby facilitating the healing of the wound.

I do not mean to confine myself to the exact details of construction herein disclosed, but claim all variations falling within the purview of the appended claim.

I claim:

A magnetic eye cup comprising an upwardly opening cup member having a peripheral bead around the upper edge thereof, a U-shaped permanent magnet disposed within said cup member and having spaced apart opposite poles, and means securing said magnet in a position overlying the inner wall of said cup member with the poles thereof disposed inwardly from the adjacent inner wall surfaces and downwardly from the top edge thereof.

RAYMOND G. HAMILTON.

REFERENCES CITED

The following references are of record in the file of this patent:

UNITED STATES PATENTS

| Number | Name | Date |
|---|---|---|
| 655,413 | Parkyn | Aug. 7, 1900 |
| 1,557,620 | Robinson | Oct. 20, 1925 |

FOREIGN PATENTS

| Number | Country | Date |
|---|---|---|
| 492 | Great Britain | of 1876 |